United States Patent [19]
Paul et al.

[11] 3,800,597
[45] Apr. 2, 1974

[54] APPARATUS FOR DETERMINING THE PROCESSING CHARACTERISTICS OF PLASTIC TYPE MATERIALS

[76] Inventors: Keith Thomas Paul, 9 Birch Dr., Shawbury, Shrewsbury, Shropshire; George Martin Gale, Westwinds, Lyth Bank, Shrewsbury, Shropshire; Richard Thomas Humpidge, Rose Cottage, Prescott Baschurch, Shrewsbury, Shropshire, all of England

[22] Filed: Aug. 11, 1972

[21] Appl. No.: 280,036

[30] Foreign Application Priority Data
Aug. 11, 1971 Great Britain ................... 37653/71

[52] U.S. Cl. .................................................. 73/59
[51] Int. Cl. .......................................... G01n 11/14
[58] Field of Search ............................. 73/59, 60, 56

[56] References Cited
UNITED STATES PATENTS
3,229,507  1/1966  Sljaka et al. ............................ 73/59
3,289,466  12/1966  Banks ...................................... 73/59
3,229,506  1/1966  Bruss et al. .............................. 73/59

FOREIGN PATENTS OR APPLICATIONS
319,633  1/1970  Sweden .................................. 73/56

Primary Examiner—Richard C. Queisser
Assistant Examiner—Joseph W. Roskos
Attorney, Agent, or Firm—Browne, Beveridge, DeGrandi & Kline

[57] ABSTRACT

The present invention provides improved apparatus for determining the processing characteristics, in particular the mixing characteristics, of materials having plastic properties. The apparatus comprises a mixing chamber having a pair of contra-rotating, differential speed, mixing rotors therein adapted to be rotated by an electric motor, transducer means for providing an electrical signal dependant upon the torque applied by the motor to the rotors, and continuous recorder means arranged to receive said electrical signal to provide a record of the torque applied.

The invention also provides a rotor design for use in the above apparatus which results in improved mixing characteristics and in more reproducible results from the apparatus.

7 Claims, 6 Drawing Figures

APPARATUS FOR DETERMINING THE PROCESSING CHARACTERISTICS OF PLASTIC TYPE MATERIALS

The present invention relates to an apparatus for determining the processing characteristics, particularly the mixing characteristics, of materials having plastic properties, such as P.V.C. dry blends.

Comparative changes in behaviour of materials during mixing can be made in a mixing device having rotary mixing heads, by measuring the power input to the driving motor for the heads or the torque applied to the driving shaft carrying the heads. Monitoring of the power input in this manner is commonly used for control during mixing in internal mixers and also in extrusion apparatus. For many years, the mixing characteristics of doughs have been determined by measuring the torque applied to a small mixer. This type of machine is easily adapted for measuring changes during mixing of clays, adhesives, rubbers and plastics etc. In the case of polymeric materials, changes can occur during mixing due to gelation of particulate material, dispersion of additives, heat development, structural breakdown, cross-linking, and thermal decomposition. These changes affect viscosity and elasticity.

In the plastics industry, materials are subjected to mixing processes either in batch mixers or in screw machines such as extruders, screw compounders and pre-plasticising injection moulding machines. In these machines, the material is transformed from granules or powder to a melt and mixing and conveying of the melt takes place. During mixing, the mechanical working can raise the temperature and a consequent reduction in viscosity occurs. Other changes will be caused by chemical changes and the influence of additives such as plasticisers, stabilisers, lubricants and cross-linking agents. Batch mixing can indicate changes that take place during continuous mixing although the behaviour is not strictly comparative. By measuring torque applied to a mixer and temperature developed in the melt, unknown materials or additives can be compared with a standard material whose processing behaviour in a continuous screw machine is known.

There is thus a demand for apparatus operating on the aforementioned principle which is simple, robust, easily operated and which will give reliable, reproducible results which are substantially independent of operator skill.

Known apparatus for operating in the foregoing manner includes a mixing chamber to which material can be fed via a chute and forced into the chamber under the action of a manually operable lever or a static weight. Material in the mixing chamber is mixed by means of one or more mixing rotors which are rotated by means of a motor. The torque applied to the mixing rotors is measured mechanically by means of a lever system which displaces the pen of a chart recorder.

The known apparatus possesses, however, a number of disadvantages. For example, the mechanical system of torque measurement renders routine adjustment of zero and calibration very difficult. Reproducibility can only be checked by carrying out tests using a standard mix but this is subject to the possibility of risk of long term variations of such a standard. Range changing by adjusting lever points and sliding weights is inconvenient and can cause confusion to lesser skilled operators. When rapid fusion materials are tested, accuracy and reproducibility are poor. Furthermore, reproducibility is poor when very long fusion times are involved.

In accordance with one aspect of the present invention, apparatus is provided which comprises a mixing chamber having at least two mixing rotors therein adapted to be rotated by an electric motor, transducer means for providing an electric signal dependant upon the torque applied by the motor to the rotors, and continuous recorder means arranged to receive said electric signal to provide a record of the torque applied.

Advantageously, the recorder means is a twin trace chart recorder adapted to provide two side by side traces, one of which is indicative of the torque applied by the motor to the rotors and the other of which is arranged to indicate the temperature recorded by a thermocouple located in, or adjacent, the mixing chamber. Alternatively, a twin trace chart recorder may be used which employs overlapping traces.

Preferably, material to be mixed is forced into the mixing chamber under the action of a pneumatically actuable loading ram whereby a substantially constant loading pressure can be maintained.

Conveniently, the transducer for providing the electrical torque-dependant signal comprises a conventional load cell. The motor is mounted in bearings so that it is rotatable about its longitudinal axis, rotation being restrained by the load cell, whereby the signal provided by the cell is proportional to the torque required to restrain the motor and hence proportional to the torque applied by the motor to the rotors.

In accordance with a second aspect of the invention, each mixing rotor has a helical blade which is arranged to impart to material in the chamber movement towards only one axial end of the chamber. To achieve this, the blades display a constant sign, relative to the rotational axis of the blade, along their leading and trailing edges and also along their operating surfaces.

Preferably, each rotor carries a radially extending flange which is received in a recess in the chamber wall to reduce the tendency for material to leak from the mixing chamber into the rotor bearings. Advantageously, the blade of each rotor is connected to the flange by way of a shallow curved portion to prevent a material build up in this region.

The invention will be described further, by way of example, with reference to the accompanying drawings, in which.

Figure 1:
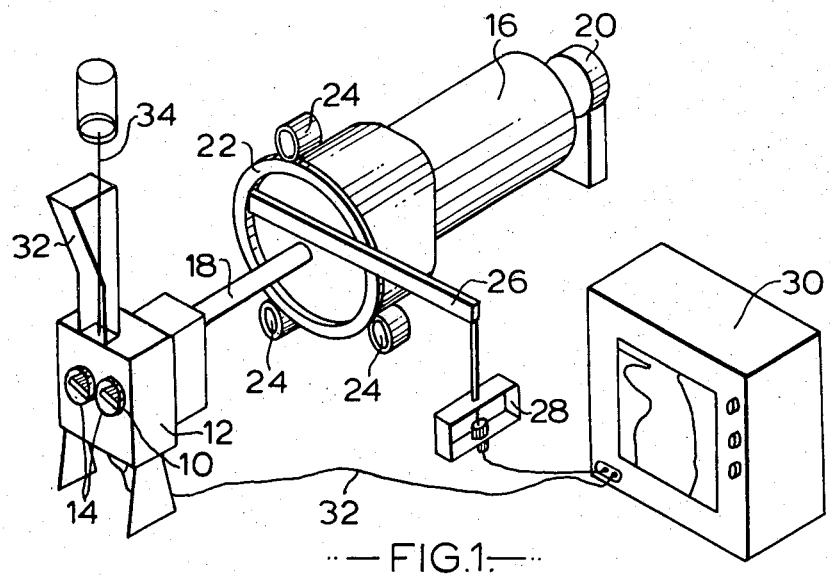
FIG. 1 is a diagrammatic perspective view of apparatus in accordance with the present invention.

The apparatus shown diagrammatically in FIG. 1 comprises a mixing chamber 10 defined in a clock 12 and having a pair of contra-rotatable mixing rotors 14 therein. The mixing rotors 14 are adapted to be rotated by a motor and gearbox unit 16 by way of a driving shaft 18. The motor and gearbox unit 16 is mounted on a stationary base (not shown), the rear end being supported by an axial bearing 20, while the front end carries a circular plate 22 which is located between three rollers 24 mounted at 120° intervals around the plate 22. In this manner, the motor and gear box unit 16 is free to rotate about its longitudinal axis. Rotation of the unit 16 is, however, restrained by a ground and hardened steel torque arm 26 attached at one end to the front end of the motor and gearbox unit 16 and at the other end to a load cell 28. The load cell 28 comprises a double cantilever beam whose deflection is measured by a differential transformer type displacement transducer. The deflection of the beam is proportional to the torque applied to the driving shaft 18 by the motor and gearbox unit 16 so that an electrical output signal is generated by the transducer of magnitude proportional to the torque required to rotate the rotors 14.

The maximum working deflection of the beam can be arranged to be of the order of 1 mm. so that angular displacement of the motor and gearbox unit 16 is extremely small. Consequently, counterbalancing of the unit 16 to compensate for its rotation is unnecessary.

The transducer output is fed to a bridge amplifier which is monitored by one track of a twin-trace chart recorder 30. Conveniently, the recorder 30 has two parallel charts and two pens which both operate on the same chart paper. The torque, as measured by the load cell 28, is recorded on a rectilinear scale on one of the charts, the other chart being arranged to record the temperature in the mixing chamber 10 on a parallel adjacent chart. To achieve the latter, a thermocouple located in the mixing chamber, but not shown in FIG.1, is connected to the recorder by way of a lead 32. The chart recorder used has a wide range of chart speeds so that fast speeds can be used for rapid fusion and slow speeds for thermal degradation tests, etc. Torque ranges can be selected by using the voltage input range selector switch on the chart recorder, while temperature ranges can be changed by selecting appropriate plug-in range boards.

Torque calibration is effected by zeroing the bridge and by adjusting the zero on the chart recorder for zero torque condition, with the mixing chamber empty. Mechanical damping of the torque measuring apparatus is unnecessary since the recorder is fitted with an adjustable damping control.

As will be further described hereinafter, material is supplied to the mixing chamber 10 by means of a chute 32 and pneumatically actuated ram 34.

Figure 2:
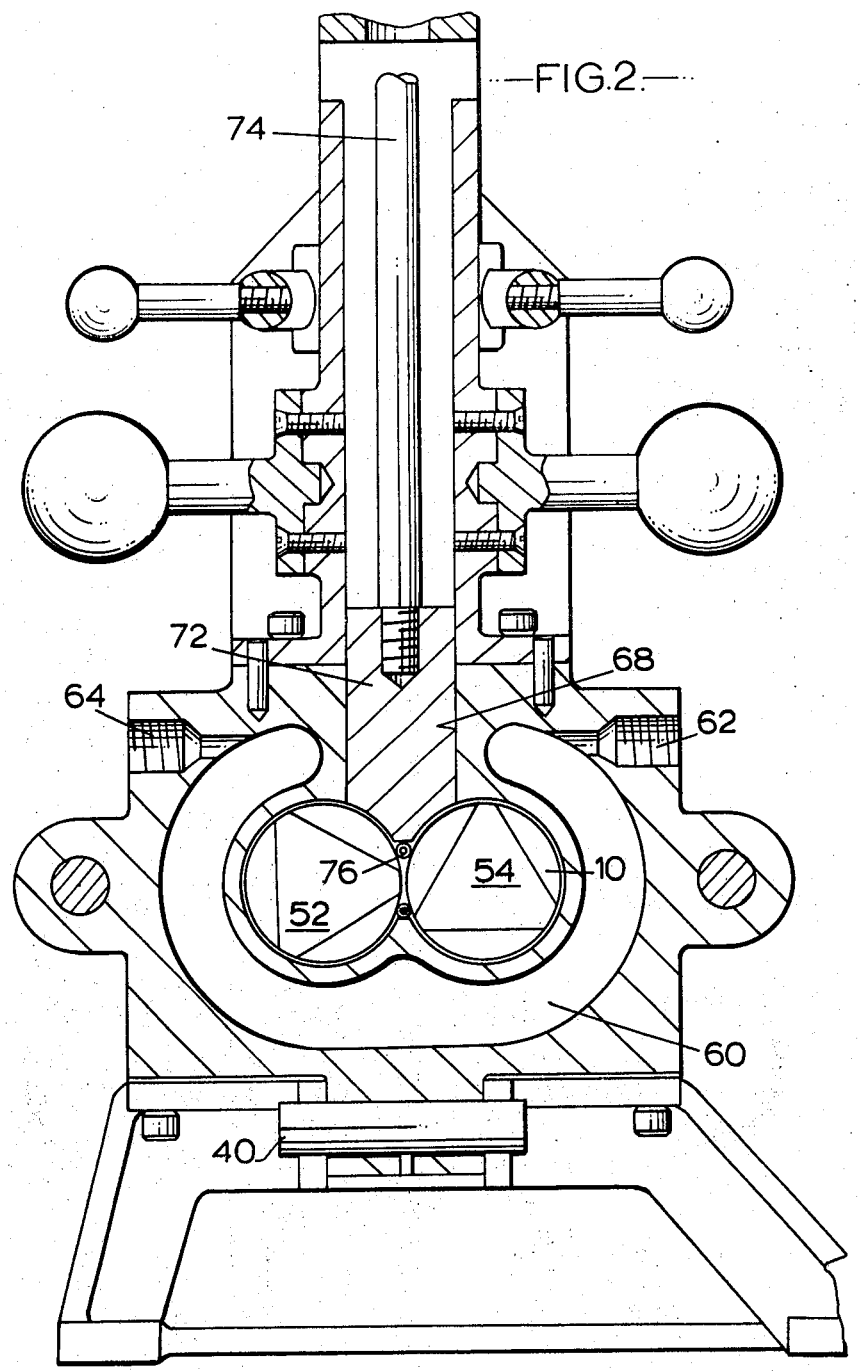
FIG. 2 is a sectional front elevation of one embodiment of mixing device for apparatus in accordance with the invention.
Figure 3:
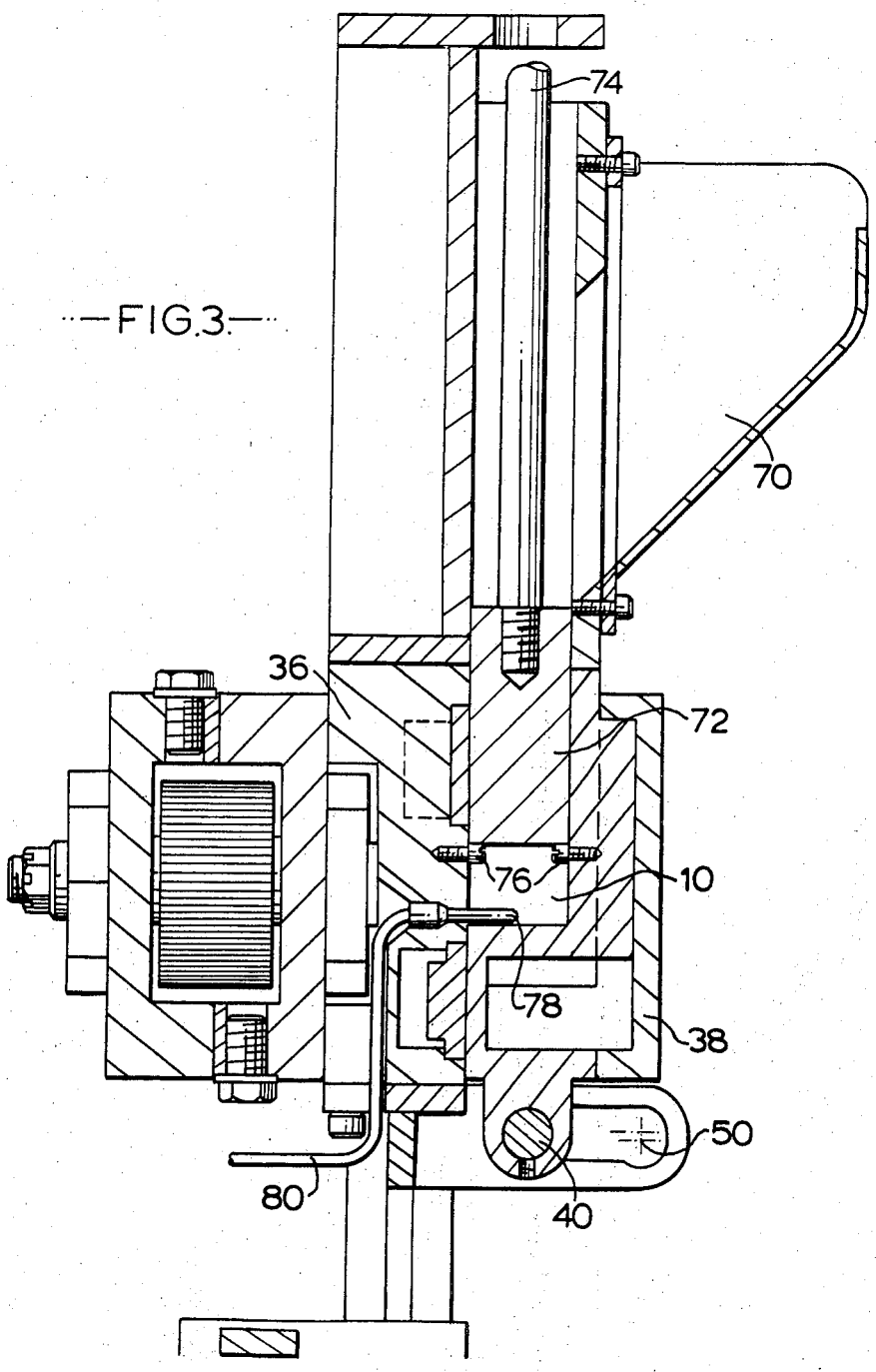
FIG. 3 is a sectional side elevation of the mixing device of FIG. 2.
Figure 4:
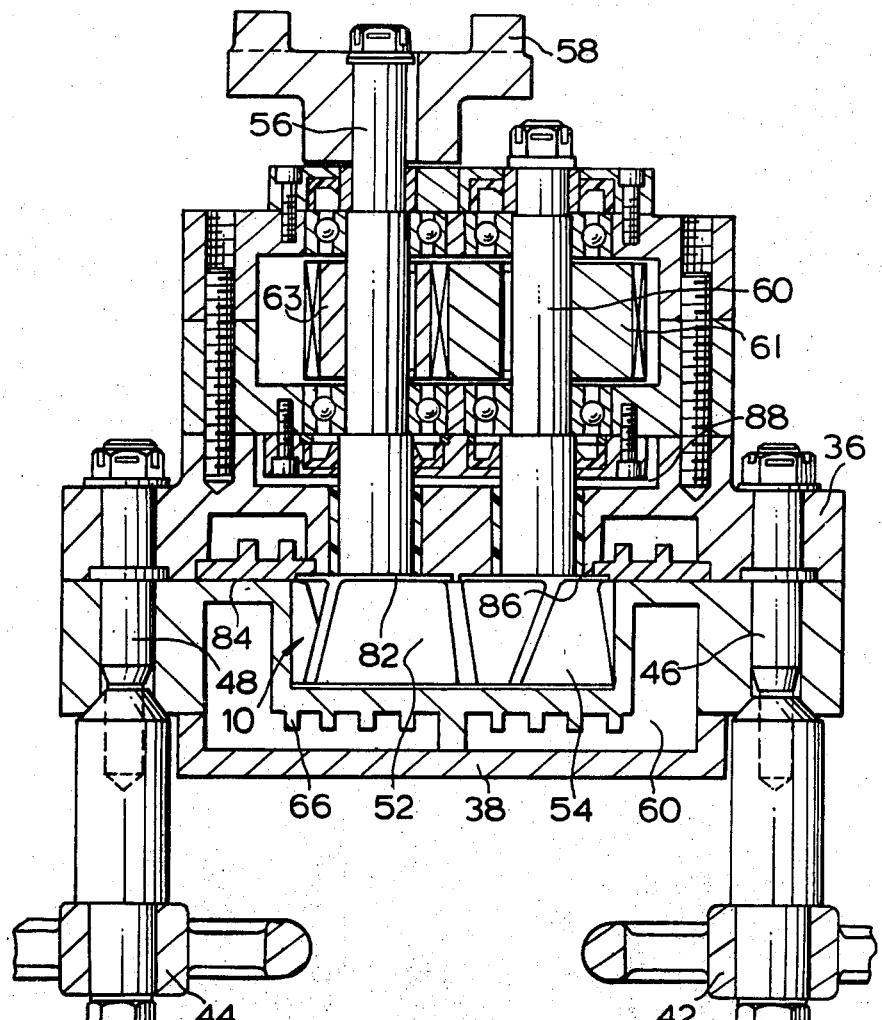
FIG. 4 is a sectional plan view of the mixing device of FIG. 2.

FIGS. 2, 3 and 4 illustrate in more detail the mixing chamber 10, the surrounding block 12 and the loading ram 34. The block 12 is formed in two separable halves 36 and 38, the front half 38 being pivotably mounted relative to the rear half 36 on a transverse pin 40. During operation, the two halves 36 and 38 of the block are clamped rigidly together by means of a pair of clamping handles 42, 44 which are screwed onto respective screw-threaded dowels 46,48 carried by the rear half 36 of the block. The handles 42,44 are formed of heat insulating material to enable the block halves to be separated whilst in a hot condition. When the handles 42,44 are removed, the front half 38 can be rotated through 90° - 100° (clockwise as viewed in FIG. 3) so that it rests in a horizontal position against a stop in an extension of the hinge. This facility is required for cleaning purposes. To enable the front half to be pivoted in the aforementioned manner the pin 40 is received in a forwardly extending slot 50 so that the front half 38 of the block can be displaced away from the rear half 36 until the rotors are clear of the mixing chamber.

Journalled in the rear block half 36 so that they project therefrom are a pair of mixing rotors 52,54 whose blade shape will be discussed further hereinafter. The rotor 52 is carried by a shaft 56 which is driven directly by the motor (not shown) through a coupling 58. The rotor 54 is carried by a shaft 60 which is adapted to be rotated via a pair of meshing gears 61,63 mounted on the shafts 60 and 56 respectively. The gears 61,63 are dimensioned such that the rotors 52,54 contra-rotate at a differential speed of, for example, 3:2 when the coupling 58 is rotated by the motor.

The front half 38 of the block has an internal recess which defines the mixing chamber 10. The mixing chamber is of FIG. 8 construction, with each lobe arranged to be of only slightly greater diameter than the diameter of the rotors located therein. The front half 38 of the block is also formed with a further chamber 60 which substantially surrounds the mixing chamber 10 and which has a pair of ports 62,64 whereby to enable oil to be passed therethrough to heat the mixing chamber to a desired temperature. Fins 66 are formed on the walls of the chamber 60 to aid heat transfer from the oil to the chamber walls.

The mixing chamber 18 communicates with a passage 68 which itself communicates with a chute 70 for receiving material to be mixed. Slidably mounted in the passage 68 is a plunger 72 which is verticaly reciprocable by means of a shaft 74 attached to a pneumatic piston (not shown). The plunger 72 can be withdrawn to enable material presented to the chute to enter the mixing chamber 12. The plunger is then urged downwardly to force the material into the mixing chamber whilst the rotors 52,54 are rotated. Clearly, the provision of the pneumatic ram enables a substantially constant loading pressure to be put on the material forced into the mixing chamber. Downward movement of the plunger 72 is limited by two stop pins 76 located in the front and rear halves of the block respectively.

A thermocouple probe 78 projects from the rear block half 36 into the mixing chamber 12, a rigid conduit 80 being provided in the block half 36 to protect the thermocouple leads.

As is best seen in FIG. 4, the mixing rotors 52,54 are designed to reduce the possibility of material in the mixing chamber escaping or leaking behind the rotors and into the drive mechanism. The rotor 52, for example, has a circular flange 82 which is recessed into the front surface 84 of the block half 36. Likewise, the rotor 54 has a circular flange 86 which is also recessed into the surface 84. Although not shown in the drawings, annular washers of PTFE, PCTFE or other material can be tightly located between the backs of the flanges 82,86 and the opposing surfaces of the block half 36. Additionally, a chamber 88 is formed in the block half 36 through which the shafts 56,60 carrying the mixing rotors 52,54 extend before reaching the gear mechanism. By this provision, material leaking from the mixing chamber along the shafts 56, 60 is collected in the chamber 88 rather than entering the gear mechanism where it would eventually cause a permanent drag on the drive. The chamber can be periodically emptied of the small amount of material which collects therein.

Preferably, the rotors 52,54 are adapted to be screwed onto the ends of the shafts 56,60 so that they may be preiodically removed for cleaning purposes.

Figure 5:
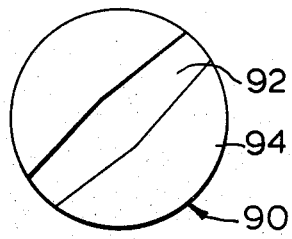
FIG. 5 is a plan view of one embodiment of a mixing rotor for apparatus in accordance with the invention.
Figure 6:
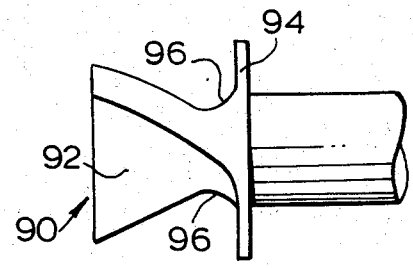
FIG. 6 is a side elevation of the rotor of FIG. 5.

A single rotor 90 is shown in more detail in FIGS.5 and 6. It will be observed that the rotor 90 has a helical blade 92 which is joined to the flanged base portion 94 by way of a shallow curved portion 96 so that there are no sharp corners where material could lodge and avoid being mixed. The blade is shaped so as to achieve a forward thrust on material in the chamber, in a direction away from the flanged portion 94, thereby reducing the pressure exerted by the material at the rotor/chamber interface and hence reducing leakage. In this respect the leading and trailing edges and the two operating surfaces of each blade all display respective constant signs relative to the rotational axis of that blade. The blade is further designed to ensure that material is drawn into the chamber during loading and mixes efficiently during a mixing cycle.

In the previously known apparatus, the rotor design was such that each rotor produced axial flow of material towards both axial ends of the mixing chamber, at the same time as producing a circulating movement of material around the chamber generally. This was achieved by rotors which themselves occupied a high percentage of the volume of the mixing chamber. The consequence of this was that the rotors failed to effectively draw material into the mixing chamber. Furthermore, the shear force developed by the rotors on the material in the chamber was small since the volume of material present was relatively small, the bulk of the available space being occupied by the rotors.

The design of the known rotors was such that the shafts were of a smaller diameter than the shaped mixing portion, so that molten plastic became wedged between the rotors and the back plate from which they projected, thereby giving rise to higher recorded torque values then were truly present. This resulted in increased wear and eventual leakage of molten material through the shaft bearings so that a higher torque level was recorded due to friction of material in the bearing. Eventually, a steady fall-off in torque was recorded due to loss of material from the mixing chamber.

These disadvantages are substantially overcome with the aforedescribed rotor design presently provided where the blade part of the rotor is relatively thin, so that the rotors occupy a relative small percentage of the volume of the mixing chamber, movement of the material is towards one end of the chamber only for each rotor, and the flanged portion is provided which is recessed into the rotor/chamber interface.

Although the apparatus described above employs three bearings, in the form of rollers 24, located around the motor flange 22, these can be replaced by other bearing arrangements, e.g. a single bearing.

Furthermore, it is to be understood that the particularly type of load-cell described above is by way of example only and that other types can be used as desired. For example, in place of the double cantilever type of load-cell described above, a load cell employing a circular proof ring may be used.

We claim :

1. Apparatus for determining the processing characteristics of plastic type materials comprising a mixing chamber having a pair of parallel, substantially cylindrical portions which communicate with each other along one side and which have closed, opposed walls at each axial end thereof, a power driven loading ramp for forcing mixture into the mixing chamber in a direction transverse to said cylindrical portions, a pair of mixing rotors respectively extending through the end walls at one axial end of said cylindrical portions, bearing means coaxially mounting said rotors for rotation in said two cylindrical portions of the mixing chamber, a radially directed flange means on each rotor which is received in a respective recess in said end walls at said one axial end of the cylindrical portions for resisting leakage of material from the mixing chamber into said rotor bearing means, an axially directed helical blade on each rotor which is profiled such that each blade imparts to material in contact therewith movement only towards a respective one of said closed axial ends of said cylindrical portions, an electric motor for contra-rotating the rotors at differential speeds, transducer means for providing an electric signal dependent upon the torque applied by the motor to the rotors, and a continuous recorder means arranged to receive said electric signal to provide a record of the torque applied.

2. Apparatus according to claim 1, in which the blade of each rotor is connected to said flange means of that rotor by way of a shallow curved portion for resisting material built-up in this region.

3. Apparatus according to claim 1, in which the curved leading and trailing edges, and the curved operating surfaces, of each rotor blade all display a respective constant sign along their length.

4. Apparatus according to claim 1, in which the mixing chamber is defined within a housing block formed in two separable parts, one part having the rotors projecting there-from and the other part defining both a recess which receives the projecting portions of the rotors and also a passage means communicating with a feeding chute, said other part of the block being hinged to said first part for enabling the whole of the mixing chamber passage means and feeding chute to be accessible for cleaning purposes.

5. Apparatus according to claim 4 in which an oil chamber is defined in at least said other part of the block for receiving oil to control the temperature of the mixing chamber.

6. Apparatus for determining the processing characteristics of plastic type materials comprising housing means defining a mixing chamber and including one end wall at one end of the chamber, a pair of mixing rotors respectively extending through said one end wall of said mixing chamber, bearing means mounting said rotors for rotation in said mixing chamber, a motor to rotate said mixing rotors, said one end wall having recess means opening into said chamber, and a radially directed flange means on and surrounding each rotor and received in said recess means in said end wall for resisting leakage of material from the mixing chamber into said bearing means.

7. The apparatus of claim 6 wherein each rotor includes an axially directed helical blade which is profiled such that each blade imparts to material in contact therewith movement away from said one end wall.

* * * * *